(12) United States Patent
Weltje

(10) Patent No.: US 8,857,136 B2
(45) Date of Patent: Oct. 14, 2014

(54) DEVICE FOR ARRANGING A SLEEVE-LIKE FOIL ENVELOPE AROUND AN OBJECT

(75) Inventor: Harm Hendrik Weltje, Deurne (NL)

(73) Assignee: Fuji Seal Europe B.V., Deurne (NL)

( * ) Notice: Subject to any disclaimer, the term of this patent is extended or adjusted under 35 U.S.C. 154(b) by 990 days.

(21) Appl. No.: 12/994,653

(22) PCT Filed: May 1, 2009

(86) PCT No.: PCT/NL2009/000110
§ 371 (c)(1),
(2), (4) Date: Jan. 18, 2011

(87) PCT Pub. No.: WO2009/145613
PCT Pub. Date: Dec. 3, 2009

(65) Prior Publication Data
US 2011/0120065 A1    May 26, 2011

(30) Foreign Application Priority Data
May 29, 2008    (NL) ...................................... 1035492

(51) Int. Cl.
B65B 9/14    (2006.01)
B65C 3/06    (2006.01)
B29C 63/42    (2006.01)

(52) U.S. Cl.
CPC ............... B29C 63/423 (2013.01); B65C 3/065 (2013.01); B65B 9/14 (2013.01)
USPC .................................. 53/585; 53/291; 53/399

(58) Field of Classification Search
CPC .......... B29C 63/423; B65C 3/065; B65B 9/14
USPC ........... 53/582, 585, 399, 291, 292, 296, 297, 53/298; 83/180
See application file for complete search history.

(56) References Cited

U.S. PATENT DOCUMENTS

| 4,016,704 A | | 4/1977 | Fujio .................................... 53/3 |
| 4,208,857 A | * | 6/1980 | Fujio ................................ 53/585 |
| 4,545,181 A | | 10/1985 | Frankefort ...................... 53/459 |
| 4,744,206 A | * | 5/1988 | Winter ............................ 53/585 |
| 4,765,121 A | * | 8/1988 | Konstantin et al. ............. 53/442 |
| 4,806,187 A | * | 2/1989 | Fujisawa ......................... 156/86 |
| 4,910,941 A | * | 3/1990 | Nagano et al. .................. 53/291 |

(Continued)

FOREIGN PATENT DOCUMENTS

| EP | 0 109 105 | 5/1984 |
| JP | S63191726 A | 8/1988 |
| JP | H0698973 B | 12/1994 |

*Primary Examiner* — Hemant M Desai
(74) *Attorney, Agent, or Firm* — Roberts & Roberts, LLP

(57) ABSTRACT

The invention relates to a device for arranging a sleeve-like foil envelope around an object, comprising supply means for supplying said sleeve-like foil envelope around at least one spreading element (190), as well as discharge means for discharging the sleeve-like foil envelope from the device and arranging it around the object. The object of the invention is to provide a device which on the one hand requires less installation space and which, in addition, is suitable for use as a multiple enveloping device, in which several envelopes can be arranged around objects simultaneously or in succession. In order to accomplish that object, the discharge means are disposed within said at least one spreading element. Not only does this lead to a significant reduction of the required installation space, but it also makes it possible to operate the device at a higher speed and as a multiple device.

20 Claims, 6 Drawing Sheets

(56) References Cited

U.S. PATENT DOCUMENTS

| | | | |
|---|---|---|---|
| 5,737,900 A * | 4/1998 | Konstantin et al. | 53/295 |
| 6,684,599 B1 * | 2/2004 | Fresnel | 53/64 |
| 7,024,841 B2 * | 4/2006 | Kramer et al. | 53/585 |
| 7,398,811 B1 * | 7/2008 | Duncan et al. | 156/392 |
| 8,146,334 B2 * | 4/2012 | Fresnel | 53/585 |
| 8,613,183 B2 * | 12/2013 | Nyren | 53/585 |
| 2004/0016207 A1 * | 1/2004 | Lortz | 53/397 |
| 2004/0128958 A1 * | 7/2004 | Kramer et al. | 53/567 |
| 2006/0090624 A1 * | 5/2006 | Chen | 83/651 |
| 2013/0118122 A1 * | 5/2013 | Heeman | 53/399 |

* cited by examiner

DEVICE FOR ARRANGING A SLEEVE-LIKE FOIL ENVELOPE AROUND AN OBJECT

This patent application is a U.S. National Phase of International Patent Application No. PCT/NL2009/00110, filed on May 1, 2009, which claims priority from Netherlands Patent Application No. 1035492, filed May 29, 2008, the disclosures of which are incorporated herein by reference in their entirety.

BACKGROUND OF THE INVENTION

1. Field of the Invention

The invention relates to a device for arranging a sleeve-like foil envelope around an object, comprising supply means for supplying said sleeve-like foil envelope around at least one spreading element, as well as discharge means for discharging the sleeve-like foil envelope from the device and arranging it around the object.

2. Description of the Related Art

Such a device is disclosed in, for example, European patent application No. 0 109 105. In said device, the foil envelope has been pre-produced in the form of a continuous strip, which is wound on a supply reel and which is to be cut to the correct length by means of a device according to the introductory paragraph. The individual flat sleeve-like foil envelopes must subsequently be opened by means of a spreading element and be placed around an object, such as a bottle or a container, with some oversize.

The foil material is made of a so-called shrink material, which shrinks as a result of heat being applied and which forms with a close fit to the shape of the bottle or container around which the sleeve-like envelope has been arranged.

A drawback of the known devices is that they are only suitable for processing thick or stiff foil materials if a high processing rate is to be realised. When thinner or more flexible foil materials are used, the processing rate must be reduced in order to prevent undesirable jamming of the device. The fact is that it has been found that in particular thin, flexible foil materials exhibit a tendency to return to their flat condition before they have been effectively arranged around the container. The device will clog up and jam in such situations, which is undesirable.

The device according to EP 0 109 105 A1 furthermore requires a significant amount of installation space, because the discharge means are positioned beside the spreading element on either side thereof. Because of this, existing devices are less suitable for use as a multiple variant, in which several spreading elements are disposed side by side in the device, and several envelopes can be arranged around objects simultaneously (or in succession).

The object of the invention is to obviate these drawbacks and in order to accomplish that object, the discharge means are disposed within said at least one spreading element. Not only does this lead to a significant reduction of the required amount of installation space, but it also makes it possible to operate the device at a higher speed and, above all, as a multiple device.

SUMMARY OF THE INVENTION

In a functional embodiment, the spreading element is cylindrical in shape and has a circumferential surface around which the sleeve-like foil envelope to be arranged around the object is to be positioned. This makes it possible to incorporate the discharge means in the spreading element, using an effective and simple construction.

In a functional embodiment, the discharge means comprise at least one first spray nozzle for delivering a medium under pressure in a direction parallel to the direction in which the sleeve-like foil envelope is discharged. This makes it possible to simply discharge the foil envelope over the spreading element in the direction of the object around which the foil envelope is to be arranged.

Said first spray nozzle may be configured as a circular slot formed in the circumferential surface of the spreading element, so as to effectively lead the medium under pressure in the direction of the foil envelope to be discharged.

In an effective, installation space-saving embodiment, each first spray nozzle is connected to a first supply line for the medium under pressure, which first supply line extends in the longitudinal direction of the spreading element, whilst furthermore each first spray nozzle is connected to said first supply line by means of a first connecting channel extending in radial direction within the spreading element.

In another functional embodiment, the discharge means comprise at least one second spray nozzle near the free end of the spreading element for delivering a medium under pressure in a direction parallel to the direction in which the sleeve-like foil envelope is discharged. Said second spray nozzle takes over the function of the first spray nozzle by further discharging the foil envelope from the device in the direction of the object around which the foil envelope is to be provided.

In an even more effective, installation space-saving embodiment, the second spray nozzle is provided along the circumferential surface of the free end of the spreading element, whilst furthermore each second spray nozzle is connected to a second supply line for the medium under pressure, which second supply line extends in the longitudinal direction of the spreading element.

In a very functional embodiment of the device according to the invention, the discharge means are furthermore arranged for imparting a rotary motion in use to the sleeve-like foil envelope to be discharged from the device.

By imparting a rotary motion to a separately formed sleeve-like envelope as it is being discharged from the device, said foil envelope will remain open, so that it can be arranged around a container in a simple and effective manner. The fact is that it has been found that in particular the thin, flexible foil materials exhibit a tendency to return from their open condition to their flat condition before they have been effectively arranged around the container. In such situations the device will clog up and jam, which is undesirable. Because of the rotary motion, the sleeve-like foil envelope will remain open better, if not longer, and will less easily tend to return to its flat condition.

More specifically, in order to impart said rotary motion to the sleeve-like foil envelope to be discharged from the device, said discharge means comprise at least one third spray nozzle for delivering a medium under pressure in tangential direction relative to the direction in which the sleeve-like foil envelope is discharged. As a result, said foil envelope will remain open, so that it can be arranged around a container in a simple and effective manner.

In an effective, installation space-saving embodiment, each third spray nozzle is connected to a third supply line for the medium under pressure, which third supply line extends in the longitudinal direction of the spreading element.

In order to realise a more effective outflow of the medium under pressure for imparting said rotary motion, each third spray nozzle is connected to the third supply line by means of a third connecting channel extending in radial direction within the spreading element.

To obtain an effective construction of the spreading element, said spreading element is according to the invention made up of several Interconnectable cylinder parts.

The medium under pressure may be compressed air.

In another functional, multiple embodiment, the device comprises several spreading elements arranged in a circular configuration.

BRIEF DESCRIPTION OF THE DRAWINGS

The invention will now be explained in more detail with reference to a drawing, in which.

DETAILED DESCRIPTION OF THE INVENTION

For a better understanding of the invention, like parts will be indicated by identical numerals in the description of the figures below.

Figure 1:
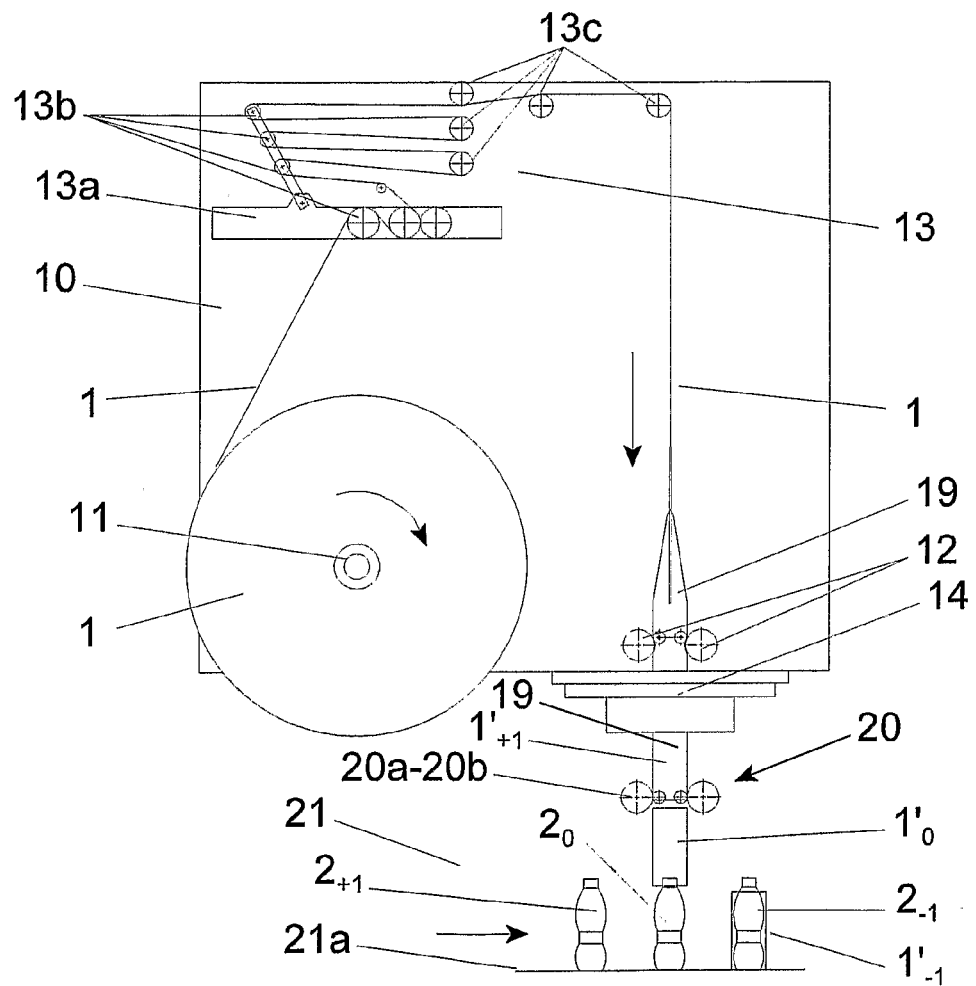
FIG. 1 shows an embodiment of a device according to the prior art.

In FIG. 1, numeral 10 indicates a device according to the prior art. The device 10 comprises supply means or conveying means 12 built up of two drivable rollers, between which a continuous strip of foil material 1 can be passed. The continuous strip of foil material 1 is wound on a supply reel 11 and is introduced into the device via a tensioning mechanism 13. The tensioning mechanism 13 comprises an arm 13a, which is pivotally connected to the device. The pivot arm 13a has several rollers 13b, over which the continuous strip of sleeve-like foil material 1 is passed. The strip of sleeve-like foil material 1 is also passed over additional, fixedly disposed rollers 13c. In this way it is possible on the one hand to realise a certain amount of stock in the continuous strip of sleeve-like foil material being unwound from the real 11, but above all it is possible to set up a certain tension therein.

The supply means 12 carry the continuous strip of sleeve-like foil material 1 past cutting means 14 for cutting the foil material 1 through at certain intervals so as to obtain individual sleeve-like foil envelopes 1'. All kinds of embodiments of the cutting means 14 are possible, which embodiments can be assumed to be known to those of average skill in the art. A spreading element 19 is provided at the location of the cutting means 14 and the discharge side of the device 10, which element functions to open the obtained individual, flat, sleeve-like foil envelopes 1' for arranging the opened sleeve-like foil envelope around a container 2.

As is clearly shown in FIG. 1, the spreading element 19 is widened at least in the plane perpendicular to the plane of the flat continuous strip of foil material 1. Thus, the individual flat sleeve-like foil envelopes . . . -$1'_{-1}$-$1'_{0}$-$1'_{+1}$- . . . are opened, so that they can be readily arranged around a container . . . -$2'_{-1}$-$2'_{0}$-$2'_{+1}$- . . . . The containers . . . -$2'_{-1}$-$2'_{0}$-$2'_{+1}$- . . . are moved by conveying means, which are assumed to be known per se, which conveying means 21 comprise a carrier 21a, on which several containers (bottles, jars or cans) are present, which containers are conveyed to the device 10.

Each individual flat sleeve-like foil envelope . . . -$1'_{-1}$-$1'_{0}$-$1'_{+1}$- . . . is opened by the spreading element 19 and cut loose from the strip of foil material 1 by the cutting means 14, whereupon the thus opened sleeve-like foil envelope can be easily arranged over a container . . . -$2'_{-1}$-$2'_{0}$-$2'_{+1}$- . . . that is ready and waiting. The containers . . . -$2'_{-1}$-$2'_{0}$-$2'_{+1}$- . . . with the opened sleeve-like foil envelopes . . . -$1'_{-1}$-$1'_{0}$-$1'_{+1}$- . . . can now be discharged from the device 10 via the carrier 21 and be subjected to a heat treatment elsewhere, causing the sleeve-like foil envelope . . . -$1'_{-1}$-$1'_{0}$-$1'_{+1}$- . . . to shrink and form around the container with a close fit.

To assist in the discharge of the individual foil envelope . . . -$1'_{-1}$-$1'_{0}$-$1'_{+1}$- . . . surrounding the container . . . -$2'_{-1}$-$2'_{0}$-$2'_{+1}$- . . . , discharge means 20 may be provided, which are incorporated in the device at the location of the spreading element 19. Said discharge means may comprise one or more drivable rollers 20a, which are supported on the stationary rollers 20b and which discharge the sleeve-like foil material 1' extending therebetween from the device 10 at an accelerated rate, with the individual, opened foil envelope . . . -$1'_{-1}$-$1'_{0}$-$1'_{+1}$- . . . "slipping" over a container . . . -$2'_{-1}$-$2'_{0}$-$2'_{+1}$- . . . , as it were.

When a sleeve-like foil envelope 1' is to be arranged around a container 2, the foil envelope needs to be moved to an open position by the spreading element 19 so as to make it possible to place the envelope quickly and easily over the container 2. Considering the fact that increasingly thin and flexible foil materials are currently being used, and also the fact that such devices are being operated at higher processing rates, it has been found that the opened sleeve-like foil envelope tends to return to its flat shape upon exiting the device 10, or the spreading element 19, before the envelope has been placed over the container 2. This phenomenon causes the device 10 to jam, which is undesirable.

FIG. 2 and FIGS. 3a-3d show an embodiment of a spreading element (indicated at 190) which can be used in an enveloping device according to the invention. According to the invention, the discharge means for discharging a sleeve-like foil envelope (not shown, but indicated at $1'_{-1}$-$1'_{0}$-$1'_{+1}$ in FIG. 1) are disposed within the spreading element 190. The discharge means, which are disposed within the spreading element 190, make use of a medium under pressure, in contrast to the prior art, which makes use of drivable conveying rollers, as shown in FIG. 1.

Figure 3:
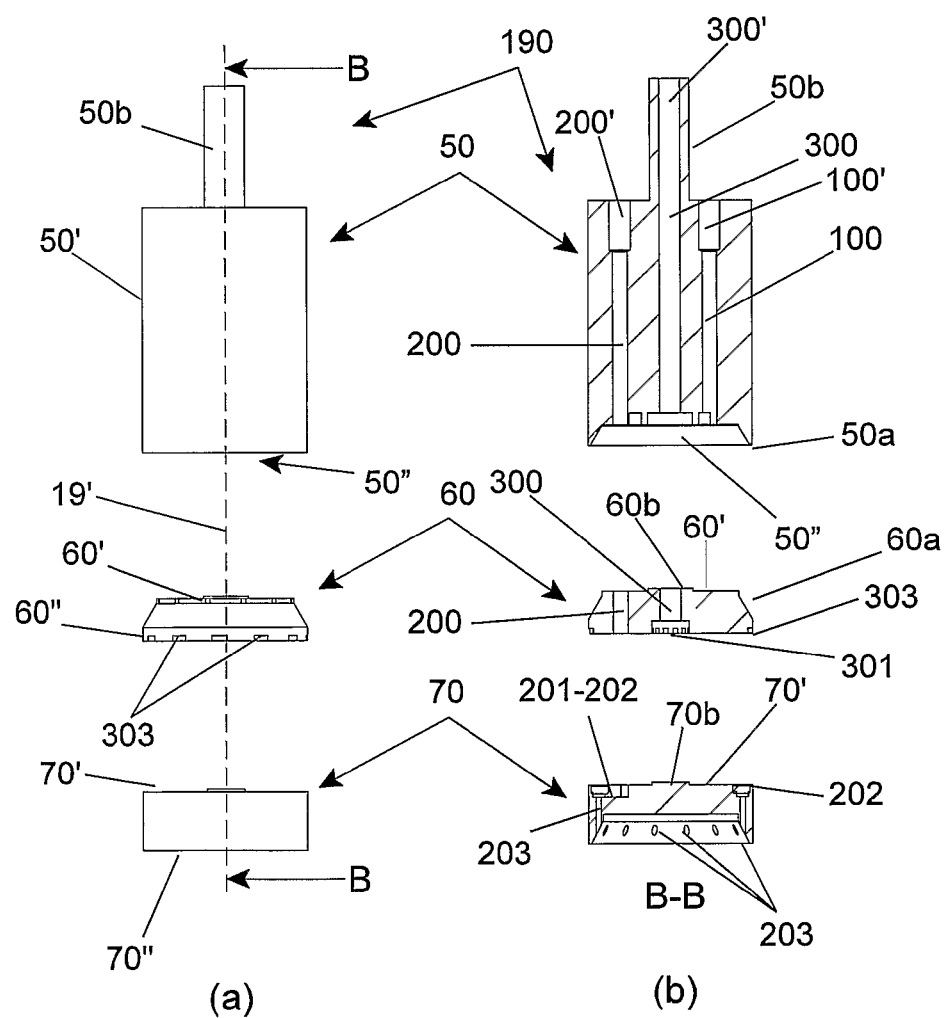
Figure 3:
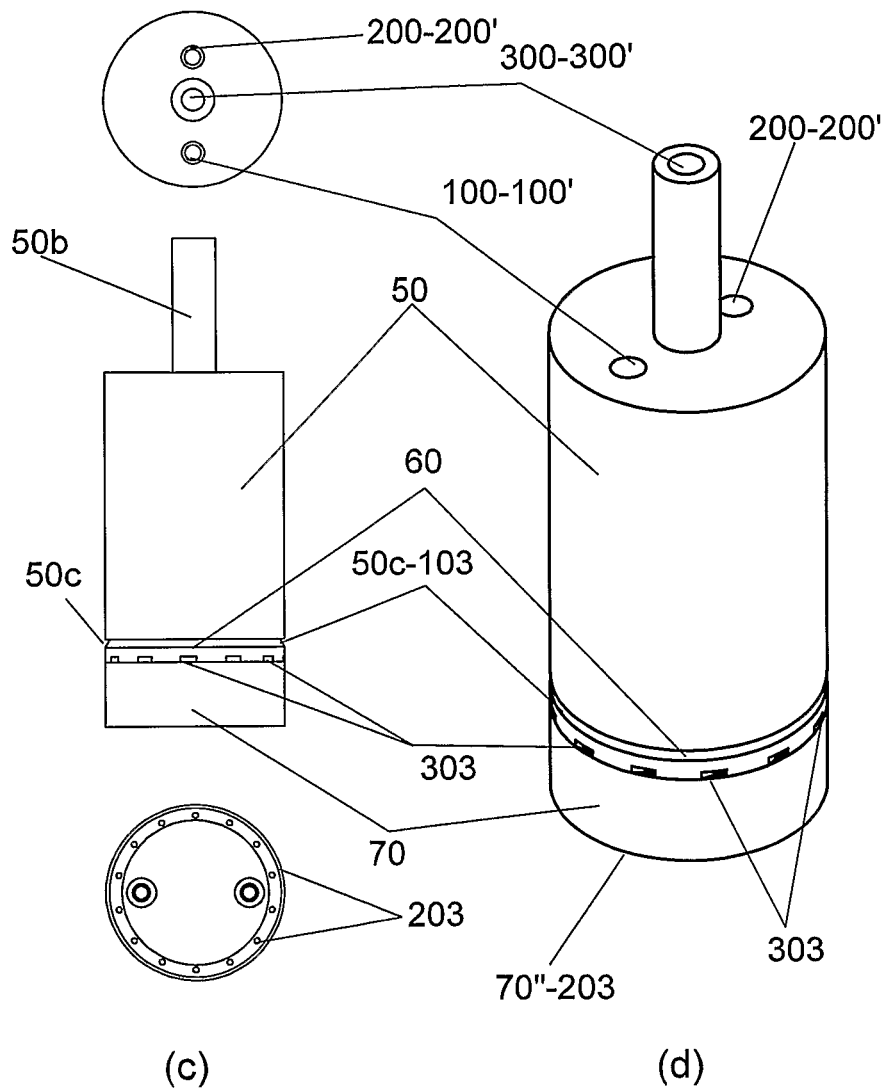

The spreading element 190 is configured as a cylindrical part, as is clearly shown in FIGS. 3c and 3d, over which a sleeve-like foil envelope can be placed for the purpose of arranging said sleeve-like foil envelope around a product (bottle or container) via the discharge means.

Figure 2:
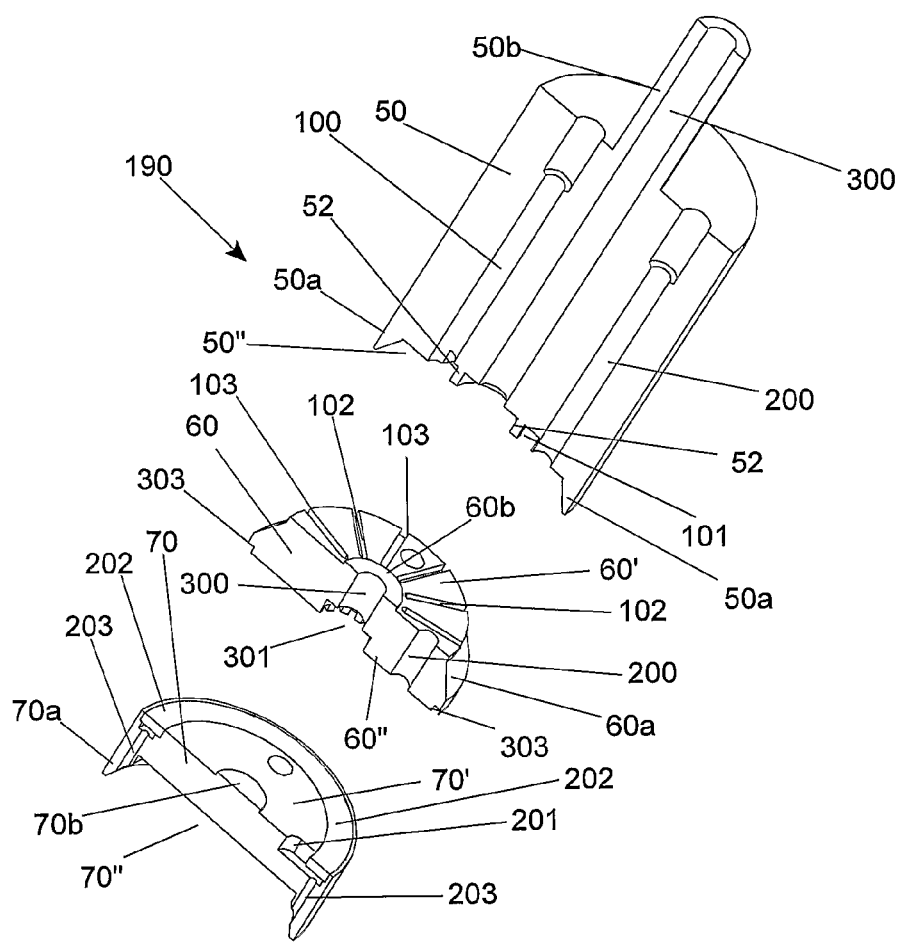
FIGS. 2, 3a-3b-3c-3d, 4a-4b-4c and 5 show various embodiments of a device according to the invention.

In this embodiment, as shown in FIG. 2, the spreading element 190 is made up of three cylinder parts, indicated with reference numerals 50-60-70. The three cylinder parts 50-60-70 can be assembled together, using assembly techniques which are known per se, so as to form one cylindrical spreading element 190. The spreading element 190 is mounted in the device 1 with the tube end 50b.

To discharge a foil envelope surrounding the spreading element, the discharge means comprise at least one first spray nozzle 103 for delivering a medium under pressure in a direction parallel to the discharge direction of the sleeve-like foil envelope. The discharge direction of the sleeve-like foil envelope is the direction from the tube end 50b to the cylinder part 70.

More specifically and as shown in, for example, FIGS. 3c-3d in combination with the cut-away views of FIGS. 3a-3b, the first nozzle 103 is configured as a circular slot 50c formed in the circumferential surface of the spreading element 190, which slot is formed by the two abutting cylinder parts 50 and 60. As is clearly shown, the cylinder part 15 of FIG. 2 has a circumferential edge 50a which extends over the bevelled flank 60a of the cylinder part 60.

The circular slot 50c is in communication with the space 50" formed between the edge 50a and the flank 60a. The circular slot or space 50c-50", which functions as a first spray nozzle, is fed with a medium under pressure, which is supplied by means of a first supply line 1000 extending in the longitudinal direction of the cylinder part 50.

The first supply line 100 terminates in the end face 50" of the cylinder part 50. The end face 50" is provided with an upright circumferential edge 52, which is supported on an upright, circumferential cam 60b formed in the end face 60' when the spreading element 190 is being assembled from the three cylinder parts 50-60-70. Upon said assembly, the end face 60' comes to abut against the end face 50" of the cylinder part 50.

The upright edge 52 and the upright cam 60b thus form a closed space or chamber, so that the first supply line 100 can be placed into flow communication with first connecting channels 101, which extend in radial direction in the end face 60' of the cylinder part 60 towards the first spray nozzles 103, which first spray nozzles are in communication with the circular slot 50c. See also FIG. 4a.

When the medium under pressure is supplied in the direction of the circular slot 50c via the first supply line 100 and the radially extending connecting channels 101, the medium under pressure is defected by the edge 50a and blown out in a direction parallel to the longitudinal direction of the spreading element 190. A foil envelope that may surround the spreading element 190 will be carried along in the direction of the discharge side 70" of the spreading element 190 by said air flow taking place inside the foil envelope.

Once the sleeve-like foil envelope has been transported past the circular slot 50c while moving over the spreading element 190, the first spray nozzle 103-50c no longer contributes to the movement of the sleeve-like foil envelope over the spreading element 190 in the direction of the container $2_0$ disposed under the spreading element 190 (see FIG. 1). To prevent the device from jamming (on account of a stationary foil envelope), the discharge means are also provided with at least a second spray nozzle 203, which is also configured so that a medium under pressure can be delivered parallel to the direction in which the sleeve-like foil envelope is discharged.

As is clearly shown in FIG. 3c, the second spray nozzles 203 are arranged as a circular ring in the circumferential end edge 70a of the cylinder part 70. The cylinder part 70 has an end face 70', which, upon assembly of the spreading element 190 from the three cylinder parts 50-60-70, is placed into abutment with the end face 60" of the cylinder part 60 together with an intermediate ring (not shown). The second spray nozzles 203 are fed with a medium under pressure via a second supply line 200, which is provided parallel to the longitudinal axis 19' of the spreading element 190 through the cylinder part 50 and the cylinder part 60. A recess 201 is formed in the end face 70' of the cylinder part 70, which recess places the second supply line 200 into communication with a circular slot 202 likewise formed in the end face 70'.

The circular slot 202 is in communication with the circular ring of second spray nozzles 203. Upon placement of the cylinder part 70 with the intermediate ring abutting against the cylinder part 60, the slot 202, together with the intermediate ring (not shown), forms a sealed air chamber (with the end face 60"), so that it is possible to supply a medium under pressure to the circular ring of second spray nozzles 203 via the supply line 200, the connecting slot 201 and the slot 202. A cylindrical medium flow can thus be generated via the circular ring of second spray nozzles 203, which flow takes place inside the sleeve-like foil envelope, keeping said foil envelope open while it is being discharged from the spreading element 190 and arranged around a container or bottle disposed under the spreading element.

This, too, prevents the opened sleeve-like foil envelope from being flattened again due to material stresses in the foil material, thereby preventing undesirable jamming of the enveloping device.

An improved discharge of the sleeve-like foil envelope over the spreading element 190 in the direction of a bottle or container placed under the spreading element can be effected by imparting a rotary motion to the sleeve-like foil envelope. As a result of said rotary motion, the foil envelope will remain open better, making it easier to place it over a container. The fact is that it has been found that in particular the thin, flexible foil materials exhibit a tendency to return to their flat condition before they have been effectively arranged around the container.

To prevent the device from becoming clogged in such situations, it may be useful to rotate the foil envelope the moment it is being discharged over the spreading element 190 in the direction of a container or bottle, so that it will remain open better and will less easily tend to return to its flat condition.

To that end, one or more third spray nozzles 303 are provided in the spreading element 190 according to the invention, which spray nozzles deliver a medium under pressure in tangential direction relative to the discharge direction of the sleeve-like foil envelope (and the longitudinal direction 19' of the spreading element 190). Said third spray nozzles 303 are shown in more detail in FIG. 4c.

Figure 4:
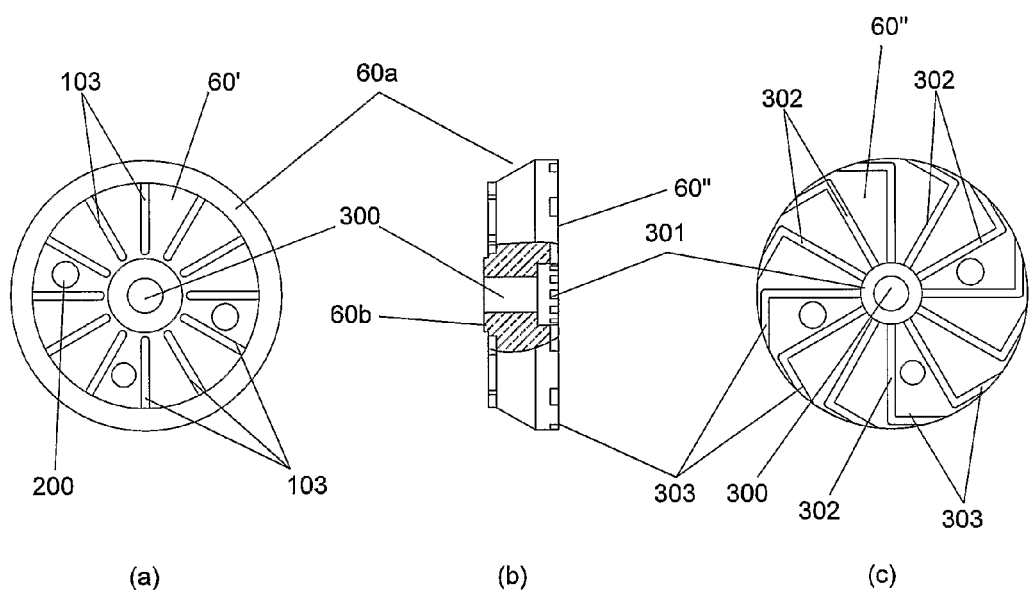

FIG. 4c shows the end face 60" of the cylinder part 60 and the outflow opening of the third supply line 300, which opens into a chamber 301 formed in the end face 60", and which, together with the upright cam 70b formed in the end face 70' of the cylinder part 70 (see FIG. 2), forms a medium chamber, in which several third connecting channels 302 extending in radial direction in the cylinder part 60 open into the tangentially oriented third spray nozzles 303.

Thus, a medium under pressure (for example compressed air) can exit the tangentially oriented third spray nozzles oriented via the third supply line 300, the distribution chamber 301 and the radially extending connecting channels 302, thereby imparting a rotary motion to the sleeve-like foil envelopes surrounding the spreading element 190.

It will be understood that the discharge of a sleeve-like foil envelope surrounding the spreading element 190 requires a precise adjustment so as to realise an accurately timed delivery of medium under pressure by the various first, second and third spray nozzles 103-50c, 203, 303.

Figure 5:
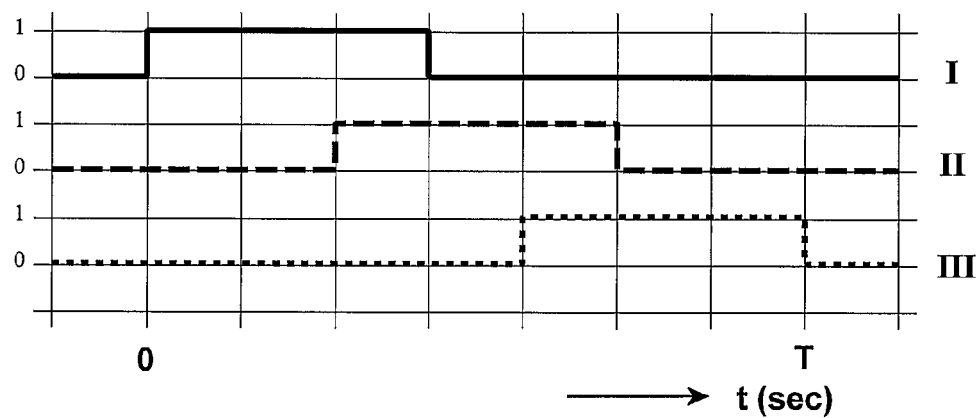

FIG. 5 shows a control or circuit diagram, according to which the medium under pressure is to be directed to the various first, second and third spray nozzles 103-50c, 203, 303 via the corresponding first, second and third supply lines 100-200-300 for every sleeve-like foil envelope surrounding the spreading element 190 so as to reliably move the respective sleeve-like foil envelope from the spreading element 190 over a container or bottle disposed thereunder.

The line indicated by Roman numeral I shows the timing diagram for the third supply line 300 and/or the third spray nozzles 303. The line indicated by Roman numeral II relates to the first supply line 100 (and the first spray nozzle 103-50c). The line indicated by Roman numeral III relates to the second supply line 200 and/or the second spray nozzles 203.

To discharge a foil envelope from the device over a container or bottle disposed under the spreading element 190 (see FIG. 1), the cycle is started at point in time t=0 by supplying medium under pressure in the direction of the third spray nozzles 303 via the third supply line 300. As a result, a rotary motion is imparted to the sleeve-like foil envelope moving over the spreading element 190, which rotary motion causes the foil envelope to remain open, so that it can be placed over the container in a stable manner without any clogging or other problems.

Shortly before the supply of medium under pressure in the third supply line 300 is shut off, medium under pressure is supplied through the first supply line 100 and the first spray nozzles 103-50c connected thereto. Said medium under pressure exits the first spray nozzles 103 parallel to the longitudinal direction of the spreading element (numeral 19') and is thus operative inside the rotating sleeve-like foil envelope for carrying along the rotating envelope in the direction of the outlet side 70" of the spreading element 190.

Likewise, medium under pressure is supplied via the second supply line 200 shortly before the supply of medium under pressure in the first supply line 100 is shut off for discharging the sleeve-like foil envelope definitively from the spreading element 190 (via the end face 70") and placing the rotating envelope over the container or bottle disposed thereunder.

The cycle ends at point in time t=T, whereupon the cycle is repeated with a next sleeve-like foil envelope just supplied from the device over the spreading element 190.

The first, second and third supply lines 100-200-300 are provided with connections 100'-200'-300' for connecting a further supply line for the medium under pressure thereto.

It will be understood that in this way it is possible to place sleeve-like foil envelopes over a container or bottle in a quick and effective manner, in which regard it is noted that as a result of the additional rotary motion, the sleeve-like foil envelope will remain open and will not easily return to its original flat condition. In this way undesirable jamming of the device is prevented, thereby making it possible to operate the device at a high speed.

It is also possible to incorporate several spreading elements according to the invention, so that a multiple enveloping device is obtained. The latter is made possible in particular by the compact dimension of the spreading element 190 according to the invention, which is realised due to the fact that the discharge means, which operate on the basis of the medium under pressure, are incorporated in the spreading element 190.

It is noted that the aspect of the third supply line 300 and the third tangentially oriented spray nozzles 303 is an optional aspect as far as a reliable operation of the device according to the invention is concerned. It is also possible, therefore, to operate the spreading element 190 without making use of the rotation aspect for discharging foil envelopes from the device. In such an embodiment, the timing diagram as shown in FIG. 5 will only comprise the lines II (first supply line) and III (second supply line), and the sleeve-like foil envelopes are carried through the device only by means of a translating movement.

What is claimed is:

1. A device for arranging a sleeve-like foil envelope around an object, comprising supply means for supplying said sleeve-like foil envelope around at least one spreading element; and discharge means for discharging the sleeve-like foil envelope from the device and arranging it around the object, wherein said discharge means are disposed within said at least one spreading element.

2. The device according to claim 1, wherein said spreading element is cylindrical in shape and has a circumferential surface around which the sleeve-like foil envelope to be arranged around the object is to be positioned.

3. The device according to claim 2 wherein said discharge means comprise at least one first spray nozzle for delivering a medium under pressure in a direction parallel to the direction in which the sleeve-like foil envelope is discharged.

4. The device according to claim 3 wherein each first spray nozzle is connected to a first supply line for the medium under pressure, which first supply line extends in the longitudinal direction of the spreading element.

5. The device according to claim 2, wherein said first spray nozzle is configured as a circular slot formed in the circumferential surface of the spreading element.

6. The device according to claim 1 wherein said discharge means comprise at least one first spray nozzle for delivering a medium under pressure in a direction parallel to the direction in which the sleeve-like foil envelope is discharged.

7. The device according to claim 6, wherein said first spray nozzle is configured as a circular slot formed in the circumferential surface of the spreading element.

8. The device according to claim 7 wherein each first spray nozzle is connected to a first supply line for the medium under pressure, which first supply line extends in the longitudinal direction of the spreading element.

9. The device according to claim 6 wherein each first spray nozzle is connected to a first supply line for the medium under pressure, which first supply line extends in the longitudinal direction of the spreading element.

10. The device according to claim 9, wherein each first spray nozzle is connected to said first supply line by means of a first connecting channel extending in radial direction within the spreading element.

11. The device according to claim 1 wherein said discharge means comprise at least one second spray nozzle near the free end of the spreading element for delivering a medium under pressure in a direction parallel to the direction in which the sleeve-like foil envelope is discharged.

12. The device according to claim 11, wherein said second spray nozzle is provided along the circumferential surface of the free end of the spreading element.

13. The device according to claim 12 wherein each second spray nozzle is connected to a second supply line for the medium under pressure, which second supply line extends in the longitudinal direction of the spreading element.

14. The device according to claim 1 wherein said discharge means are furthermore arranged for imparting a rotary motion in use to the sleeve-like foil envelope to be discharged from the device.

15. The device according to claim 14 wherein, in order to impart said rotary motion to the sleeve-like foil envelope to be discharged from the device, said discharge means comprise at least one third spray nozzle for delivering a medium under pressure in tangential direction relative to the direction in which the sleeve-like foil envelope is discharged.

16. The device according to claim 15, wherein each third spray nozzle is connected to a third supply line for the medium under pressure, which third supply line extends in the longitudinal direction of the spreading element.

17. The device according to claim 16, wherein each third spray nozzle is connected to the third supply line by means of a third connecting channel extending in radial direction within the spreading element.

18. The device according to claim 1 wherein said spreading element is made up of several interconnectable cylinder parts.

19. The device according to claim 1 wherein said medium under pressure is compressed air.

20. The device according to claim 1 which comprises several spreading elements arranged in a circular configuration.

* * * * *